(12) United States Patent
Aoki

(10) Patent No.: US 11,927,241 B2
(45) Date of Patent: Mar. 12, 2024

(54) SHOCK ABSORBER

(71) Applicant: Hitachi Astemo, Ltd., Ibaraki (JP)

(72) Inventor: Yasuhiro Aoki, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 91 days.

(21) Appl. No.: 17/439,486

(22) PCT Filed: Jan. 10, 2020

(86) PCT No.: PCT/JP2020/000661
§ 371 (c)(1),
(2) Date: Sep. 15, 2021

(87) PCT Pub. No.: WO2020/195010
PCT Pub. Date: Oct. 1, 2020

(65) Prior Publication Data
US 2022/0154797 A1 May 19, 2022

(30) Foreign Application Priority Data
Mar. 26, 2019 (JP) .................................. 2019-058113

(51) Int. Cl.
*F16F 9/36* (2006.01)

(52) U.S. Cl.
CPC .............. *F16F 9/368* (2013.01); *F16F 9/364* (2013.01)

(58) Field of Classification Search
CPC .... F16F 9/36; F16F 9/362; F16F 9/364; F16F 9/368
See application file for complete search history.

(56) References Cited

U.S. PATENT DOCUMENTS

| 4,108,287 A | 8/1978 | Kato |
| 4,482,036 A * | 11/1984 | Wossner ................. F16F 9/364 |
| | | 188/322.13 |

(Continued)

FOREIGN PATENT DOCUMENTS

| JP | 1-78743 U | 5/1989 |
| JP | 4312973 B2 | 8/2009 |
| JP | 2014-163517 A | 9/2014 |

OTHER PUBLICATIONS

International Search Report received in corresponding International Application No. PCT/JP2020/000661 dated Mar. 10, 2020.

(Continued)

*Primary Examiner* — Thomas W Irvin
(74) *Attorney, Agent, or Firm* — MATTINGLY & MALUR, PC

(57) ABSTRACT

This shock absorber includes a friction generating member which is provided at a position on a side defined by a seal member of a cylinder and comes into sliding contact with a piston rod. The friction generating member has an annular elastic rubber portion which comes into sliding contact with the piston rod and a base portion to which the elastic rubber portion is fixedly attached. The elastic rubber portion is formed such that an upstream side and a downstream side are able to communicate with each other when a differential pressure between a one side chamber of the cylinder and a reservoir chamber reaches a predetermined pressure.

9 Claims, 5 Drawing Sheets

(56) References Cited

U.S. PATENT DOCUMENTS

| | | | | |
|---|---|---|---|---|
| 5,176,229 A * | 1/1993 | Kanari | ................... | F16F 9/364 188/315 |
| 6,547,046 B2 * | 4/2003 | Yamaguchi | ............. | F16F 9/363 188/322.18 |
| 6,622,832 B2 * | 9/2003 | Ashiba | ................... | F16F 9/365 188/315 |
| 6,644,446 B2 * | 11/2003 | Kachi | ................. | F16F 9/3242 188/284 |
| 7,793,584 B2 * | 9/2010 | Murakami | .............. | F16F 9/364 92/168 |
| 8,079,598 B2 * | 12/2011 | Murakami | .............. | F16F 9/363 277/552 |
| 9,062,734 B2 * | 6/2015 | Yamashita | ............ | F16F 9/5126 |
| 9,360,078 B2 * | 6/2016 | Yamashita | ................ | F16F 9/18 |
| 10,253,840 B2 * | 4/2019 | Ashiba | ................. | F16F 9/3242 |
| 11,274,724 B2 * | 3/2022 | Ashiba | .................. | F16F 9/364 |
| 2001/0023638 A1 * | 9/2001 | Yamaguchi | ............. | F16F 9/363 92/165 R |
| 2002/0063024 A1 * | 5/2002 | Ashiba | ................... | F16F 9/365 188/315 |
| 2009/0108537 A1 * | 4/2009 | Murakami | .............. | F16F 9/363 277/549 |
| 2014/0238796 A1 | 8/2014 | Yamashita et al. | | |
| 2015/0204412 A1 * | 7/2015 | Yamashita | ................ | F16F 9/18 188/271 |
| 2018/0017129 A1 * | 1/2018 | Ashiba | ...................... | F16F 9/36 |
| 2021/0324935 A1 * | 10/2021 | Yamashita | ................ | F16F 9/32 |
| 2021/0348668 A1 * | 11/2021 | Nakagawa | ................ | F16F 7/09 |

OTHER PUBLICATIONS

Written Opinion received in corresponding International Application No. PCT/JP2020/000661 dated Mar. 10, 2020.

Japanese Office Action received in corresponding Japanese Application No. 2021-508100 dated Sep. 6, 2022.

* cited by examiner

SHOCK ABSORBER

TECHNICAL FIELD

The present invention relates to a shock absorber.
Priority is claimed on Japanese Patent Application No. 2019-058113, filed Mar. 26, 2019, the content of which is incorporated herein by reference.

BACKGROUND ART

A shock absorber which has a friction generating member generating a frictional resistance with respect to a moving piston rod in addition to a seal member preventing leakage of a working fluid has been disclosed (for example, refer to Patent Document 1).

CITATION LIST

Patent Document

[Patent Document 1]
Japanese Patent No. 4312973

SUMMARY OF INVENTION

Technical Problem

Regarding shock absorbers, it is desired to obtain favorable working characteristics using a friction generating member.
Hence, an object of the present invention is to provide a shock absorber capable of obtaining favorable working characteristics.

Solution to Problem

According to an aspect of the present invention, there is provided a shock absorber including a friction generating member which is provided at a position on a side defined by a seal member of a cylinder and comes into sliding contact with a piston rod. The friction generating member has an annular elastic rubber portion which comes into sliding contact with the piston rod and a base portion to which this elastic rubber portion is fixedly attached. The elastic rubber portion is formed such that an upstream side and a downstream side of the elastic rubber portion are able to communicate with each other when a differential pressure between a one side chamber of the cylinder and a reservoir chamber reaches a predetermined pressure.

Advantageous Effects of Invention

According to the foregoing shock absorber, it is possible to obtain favorable working characteristics.

DESCRIPTION OF EMBODIMENTS

First Embodiment

Figure 1:
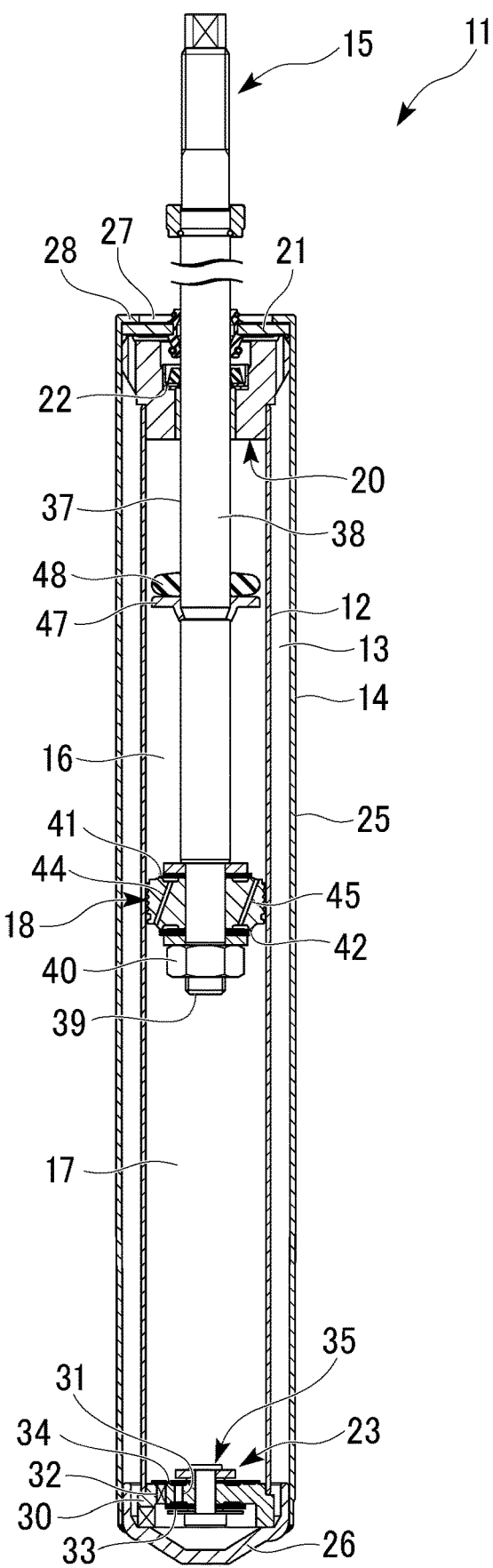
FIG. 1 is a cross-sectional view illustrating a shock absorber according to a first embodiment of the present invention.

A shock absorber according to a first embodiment of the present invention will be described below with reference to FIGS. 1 to 3.
A shock absorber 11 according to the first embodiment is a fluid pressure shock absorber in which a working fluid is used as a working liquid. More specifically, the shock absorber 11 is a hydraulic shock absorber in which a hydraulic fluid is used as a working fluid. The shock absorber 11 is used in a suspension device of an automobile.
The shock absorber 11 has a cylinder 12 having a cylindrical shape filled with a working fluid, an outer tube 14 having a larger diameter than the cylinder 12 and having a bottomed cylindrical shape provided on an outer circumferential side of the cylinder 12 in a state of being coaxial with the cylinder 12, and a reservoir chamber 13 formed between the outer tube 14 and the cylinder 12.
In addition, the shock absorber 11 has a piston rod 15 which is disposed on a center axis line of the cylinder 12, in which one end portion in an axial direction is disposed inside the cylinder 12, and in which an opposite end portion in the axial direction extends to the outside from the cylinder 12 and the outer tube 14; and a piston 18 which is fixed to the one end portion of this piston rod 15 in the axial direction, comes into sliding contact with an inner surface of the cylinder 12, and divides the inside of the cylinder 12 into two chambers such as a one side chamber 16 and an opposite side chamber 17.
The piston rod 15 integrally moves with the piston 18 which is coupled to the one end portion thereof. The opposite end portion of the piston rod 15 protrudes to the outside from the cylinder 12 and the outer tube 14. A hydraulic fluid serving as a working fluid is sealed inside the cylinder 12. A hydraulic fluid serving as a working fluid and a high pressure gas are sealed in the reservoir chamber 13 between the cylinder 12 and the outer tube 14. Instead of a high pressure gas, air at atmospheric pressure may be sealed inside the reservoir chamber 13. For example, in the shock absorber 11, the outer tube 14 is coupled to a wheel side of a vehicle and the piston rod 15 is coupled to a vehicle body side of the vehicle, thereby buffering vibration of wheels to a vehicle body.
Regarding a position of an end portion of each of the cylinder 12 and the outer tube 14 on a side where the piston rod 15 protrudes, the outer tube 14 is disposed on an outward side (a side thereabove in an upward/downward direction in FIGS. 1 to 5) in an inward/outward direction (the upward/downward direction in FIGS. 1 to 5, which will hereinafter be referred to as a cylinder inward/outward direction) in the axial direction of the cylinder 12 and the outer tube 14 from the cylinder 12. The shock absorber 11 has a rod guide 20 which is fitted to parts of the cylinder 12 and the outer tube 14 on an outward side in the cylinder inward/outward direction, and a seal member 21 which is disposed on an outward side in the cylinder inward/outward direction from the rod guide 20 and is fitted to part of the outer tube 14 on an outward side in the cylinder inward/outward direction.

In addition, the shock absorber 11 has a friction generating member 22 which is provided on an inward side in the cylinder inward/outward direction from the seal member 21 (a side therebelow in the upward/downward direction in FIGS. 1 to 5) and between the seal member 21 and the rod guide 20, and a base valve 23 which is disposed at an end portion on a side opposite to the rod guide 20 in the axial direction of the cylinder 12 and the outer tube 14, the seal member 21, and the friction generating member 22.

All of the rod guide 20, the seal member 21, and the friction generating member 22 have an annular shape. In the rod guide 20, the seal member 21, and the friction generating member 22, the piston rod 15 is inserted through each inner side thereof such that it can slide. The rod guide 20 restricts movement of the piston rod 15 in a radial direction, supports the piston rod 15 such that it can move in the axial direction, and guides this piston rod 15 such that it moves in only the axial direction.

The seal member 21 comes into sliding contact with an outer circumferential portion of the piston rod 15 moving in the axial direction at an inner circumferential portion thereof and prevents a hydraulic fluid inside the cylinder 12 and a high pressure gas and a hydraulic fluid inside the reservoir chamber 13 from leaking to the outside from the cylinder 12 and the outer tube 14. In other words, the seal member 21 prevents a hydraulic fluid and a gas inside the cylinder 12 and the outer tube 14 from leaking to the outside from the shock absorber 11. The rod guide 20 is provided at a position in the cylinder 12 on a side defined by this seal member 21 and guides the piston rod 15.

In the friction generating member 22, an outer circumferential portion thereof is fixed by being fitted to the rod guide 20. The friction generating member 22 comes into sliding contact with the outer circumferential portion of the piston rod 15 at an inner circumferential portion thereof and generates a frictional resistance in the piston rod 15, but it is not intended for sealing. The friction generating member 22 is provided at a position in the cylinder 12 on a side defined by the seal member 21 and comes into sliding contact with the piston rod 15.

The outer tube 14 has substantially a bottomed cylindrical shape including a body member 25 having a cylindrical shape, and a bottom member 26 closing one end side opposite to a protruding side of the piston rod 15 in this body member 25. The body member 25 has an interlock portion 28 protruding inward in the radial direction from a position of an opening portion 27 on the protruding side of the piston rod 15.

The cylinder 12 has a cylindrical shape. In the cylinder 12, one end side in the axial direction is supported in a fitted state by a base body 30 of the base valve 23 which is subjected to positioning and is disposed on the inner side of the bottom member 26 of the outer tube 14. An opposite end side of the cylinder 12 in the axial direction is supported in a fitted state by the rod guide 20 which is subjected to positioning and is fitted on the opening portion 27 side of the outer tube 14.

Oil passages 31 and 32 allowing communication between the opposite side chamber 17 inside the cylinder 12 and the reservoir chamber 13 between the outer tube 14 and the cylinder 12 are formed in the base body 30 of the base valve 23. In addition, in the base body 30, a disk valve 33 serving as a contraction side damping valve which can open and close the oil passage 31 on the inner side is disposed on the bottom member 26 side in the axial direction, and a disk valve 34 serving as a check valve which can open and close the oil passage 32 on the outer side is disposed on a side opposite to the bottom member 26 in the axial direction. These disk valves 33 and 34 are attached to the base body 30 using a rivet 35 inserted through the base body 30. In the present embodiment, the disk valves 33 and 34 are constituted to be attached to the base body 30 using the rivet 35 inserted through the base body 30, but they may be attached using a bolt and a nut.

The disk valve 33 allows a flow of a hydraulic fluid from the opposite side chamber 17 to the reservoir chamber 13 side via a passage hole (not illustrated) of the disk valve 34 and the oil passage 31 and generates a damping force while restricting a flow of a hydraulic fluid in the opposite direction. In contrast to this, the disk valve 34 allows a flow of a hydraulic fluid from the reservoir chamber 13 to the opposite side chamber 17 side via the oil passage 32 without any resistance while restricting a flow of a hydraulic fluid in the opposite direction. Namely, the disk valve 33 is a damping valve generating a damping force when the oil passage 31 is opened if the piston rod 15 moves to a contraction side where an amount of entry to the cylinder 12 and the outer tube 14 is increased, the piston 18 moves to the opposite side chamber 17 side, and the pressure in the opposite side chamber 17 becomes higher than the pressure in the reservoir chamber 13. In addition, the disk valve 34 opens the oil passage 32 if the piston rod 15 moves to an extension side where an amount of protrusion from the cylinder 12 and the outer tube 14 is increased, the piston 18 moves to the one side chamber 16 side, and the pressure in the opposite side chamber 17 falls below the pressure in the reservoir chamber 13. The disk valve 34 is a suction valve which causes a hydraulic fluid to flow practically without generating a damping force inside the opposite side chamber 17 from the reservoir chamber 13 at that time.

A damping force on the extension side may be actively generated by the disk valve 34 serving as a check valve. In addition, these disk valves 33 and 34 may be eliminated and orifices may be adopted.

The piston rod 15 has a main shaft portion 38 which has an outer circumferential surface 37 constituted of a cylinder surface with a uniform diameter, and an inner end shaft portion 39 which is at an end portion on a side inserted into the cylinder 12 and has a smaller diameter than the main shaft portion 38. A nut 40 is screwed into this inner end shaft portion 39, and the piston 18 and disk valves 41 and 42 on both sides thereof are attached to the inner end shaft portion 39 by this nut 40.

The one side chamber 16 is formed between the piston 18 and the rod guide 20. The one side chamber 16 is a rod side chamber in which the piston rod 15 penetrates the inner side thereof. The opposite side chamber 17 is formed between the piston 18 and the base valve 23. The opposite side chamber 17 is a bottom side chamber on the bottom member 26 side in the cylinder 12. The piston rod 15 does not penetrate the inner side of the opposite side chamber 17.

In the piston rod 15, a stopper member 47 and a buffer body 48 both having a tonic shape are provided at a part of the main shaft portion 38 between the piston 18 and the rod guide 20. In the stopper member 47, the piston rod 15 is inserted through an inner circumferential side. The stopper member 47 is caulked and is fixed to the main shaft portion 38. In the buffer body 48, the piston rod 15 is inserted through the inner side. The buffer body 48 is disposed between the stopper member 47 and the rod guide 20. The buffer body 48 abuts the rod guide 20 and alleviates a shock when the piston rod 15 extends to the end.

Oil passages 44 and 45 allowing communication between the opposite side chamber 17 in the cylinder 12 on the bottom member 26 side in the axial direction and the one side chamber 16 on a side opposite to the bottom member 26 are formed in the piston 18. In addition, in the piston 18, the disk valve 41 serving as a contraction side damping valve which can open and close the oil passage 44 is disposed on a side opposite to the bottom member 26 in the axial direction. In the piston 18, the disk valve 42 serving as an extension side damping valve which can open and close the oil passage 45 is disposed on the bottom member 26 side in the axial direction.

The disk valve 41 allows a flow of a hydraulic fluid from the opposite side chamber 17 to the one side chamber 16 side via the oil passage 44, while restricting a flow of a hydraulic fluid in the opposite direction. In contrast to this, the disk valve 42 allows a flow of a hydraulic fluid from the one side chamber 16 side to the opposite side chamber 17 via the oil passage 45, while restricting a flow of a hydraulic fluid in the opposite direction. A fixing orifice (not illustrated) allowing communication between the opposite side chamber 17 and the one side chamber 16 via the oil passage 44 even if the disk valve 41 is in a closed state is provided between the disk valve 41 and the piston 18. A fixing orifice (not illustrated) allowing communication between the opposite side chamber 17 and the one side chamber 16 via the oil passage 45 even if the disk valve 42 is in a closed state is also provided between the disk valve 42 and the piston 18.

If the piston rod 15 moves to the contraction side, the piston 18 moves to the opposite side chamber 17 side, and the pressure in the opposite side chamber 17 becomes higher than that in the one side chamber 16, a fixing orifice (not illustrated) causes a hydraulic fluid to flow from the opposite side chamber 17 to the one side chamber 16 in a uniform flow channel area in a region where a movement speed of the piston 18 (which will hereinafter be referred to as a piston speed) is low. Accordingly, a damping force of orifice characteristics is generated. In addition, in a region of a high piston speed, the disk valve 41 is separated from the piston 18, opens the oil passage 44, and causes a hydraulic fluid to flow from the opposite side chamber 17 to the one side chamber 16 in a flow channel area corresponding to the amount of separation from the piston 18. Accordingly, a damping force of valve characteristics is generated.

If the piston rod 15 moves to the extension side, the piston 18 moves to the one side chamber 16 side, and the pressure in the one side chamber 16 becomes higher than that in the opposite side chamber 17, a fixing orifice (not illustrated) causes a hydraulic fluid to flow from the one side chamber 16 to the opposite side chamber 17 in a uniform flow channel area in a region of a low piston speed. Accordingly, a damping force of orifice characteristics is generated. In addition, in a region of a high piston speed, the disk valve 42 is separated from the piston 18, opens the oil passage 45, and causes a hydraulic fluid to flow from the one side chamber 16 to the opposite side chamber 17 in a flow channel area corresponding to the amount of separation from the piston 18. Accordingly, a damping force of valve characteristics is generated.

If the piston rod 15 moves to the extension side and the amount of protrusion from the cylinder 12 and the outer tube 14 increases, a hydraulic fluid corresponding to this amount opens the disk valve 34 of the base valve 23 and flows from the reservoir chamber 13 to the opposite side chamber 17 via the oil passage 32. In contrast, if the piston rod 15 moves to the contraction side and the amount of insertion into the cylinder 12 and the outer tube 14 increases, a hydraulic fluid corresponding to this amount opens the disk valve 33 and flows from the opposite side chamber 17 to the reservoir chamber 13 via the oil passage 31.

Figure 2:
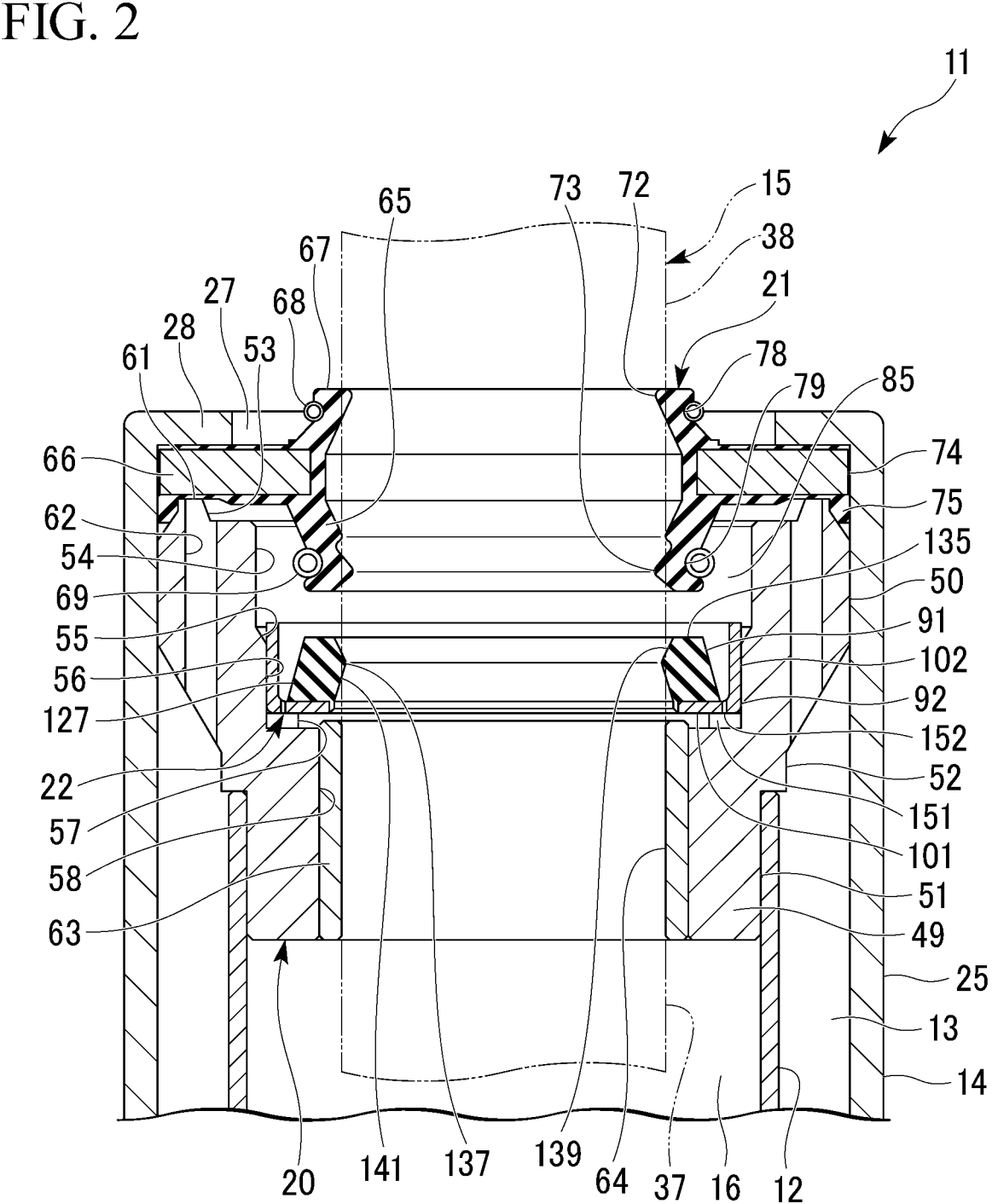
FIG. 2 is a partial cross-sectional view illustrating a piston rod extension side of the shock absorber according to the first embodiment of the present invention.

As illustrated in FIG. 2, the rod guide 20 has a metal rod guide main body 49 having substantially a stepped cylindrical shape. In the rod guide main body 49, a large outer diameter portion 50 is formed on one side in the axial direction, and a small outer diameter portion 51 having a smaller diameter than the large outer diameter portion 50 is formed on the opposite side in the axial direction. The rod guide main body 49 has an external shape in which an intermediate outer diameter portion 52 having an intermediate outer diameter thereof is formed therebetween. The rod guide main body 49 is fitted to the inner circumferential portion of the body member 25 of the outer tube 14 in the large outer diameter portion 50 and is fitted to the inner circumferential portion of the cylinder 12 in the small outer diameter portion 51.

At the center of the rod guide main body 49 in the radial direction, a largest diameter hole portion 53 having a circular shape is formed at an end portion on the large outer diameter portion 50 side in the axial direction. At the center of the rod guide main body 49 in the radial direction, a large diameter hole portion 54 having a circular shape with a smaller diameter than the largest diameter hole portion 53 is formed on the small outer diameter portion 51 side in the axial direction from the largest diameter hole portion 53. In addition, a tapered hole portion 55 which has a smaller diameter as it is separated from the large diameter hole portion 54 is formed on a side of the large diameter hole portion 54 opposite to the largest diameter hole portion 53 in the axial direction. An intermediate diameter hole portion 56 having a circular shape with a slightly smaller diameter than the large diameter hole portion 54 is formed on a side of the tapered hole portion 55 opposite to the large diameter hole portion 54 in the axial direction. In addition, a small diameter hole portion 57 having a different shape with a smaller smallest diameter than the tapered hole portion 55 is formed on a side of the intermediate diameter hole portion 56 opposite to the intermediate diameter hole portion 56 in the axial direction. A smallest diameter hole portion 58 having a diameter smaller than the smallest diameter of the small diameter hole portion 57 is formed on a side of the small diameter hole portion 57 opposite to the intermediate diameter hole portion 56 in the axial direction.

Figure 3:
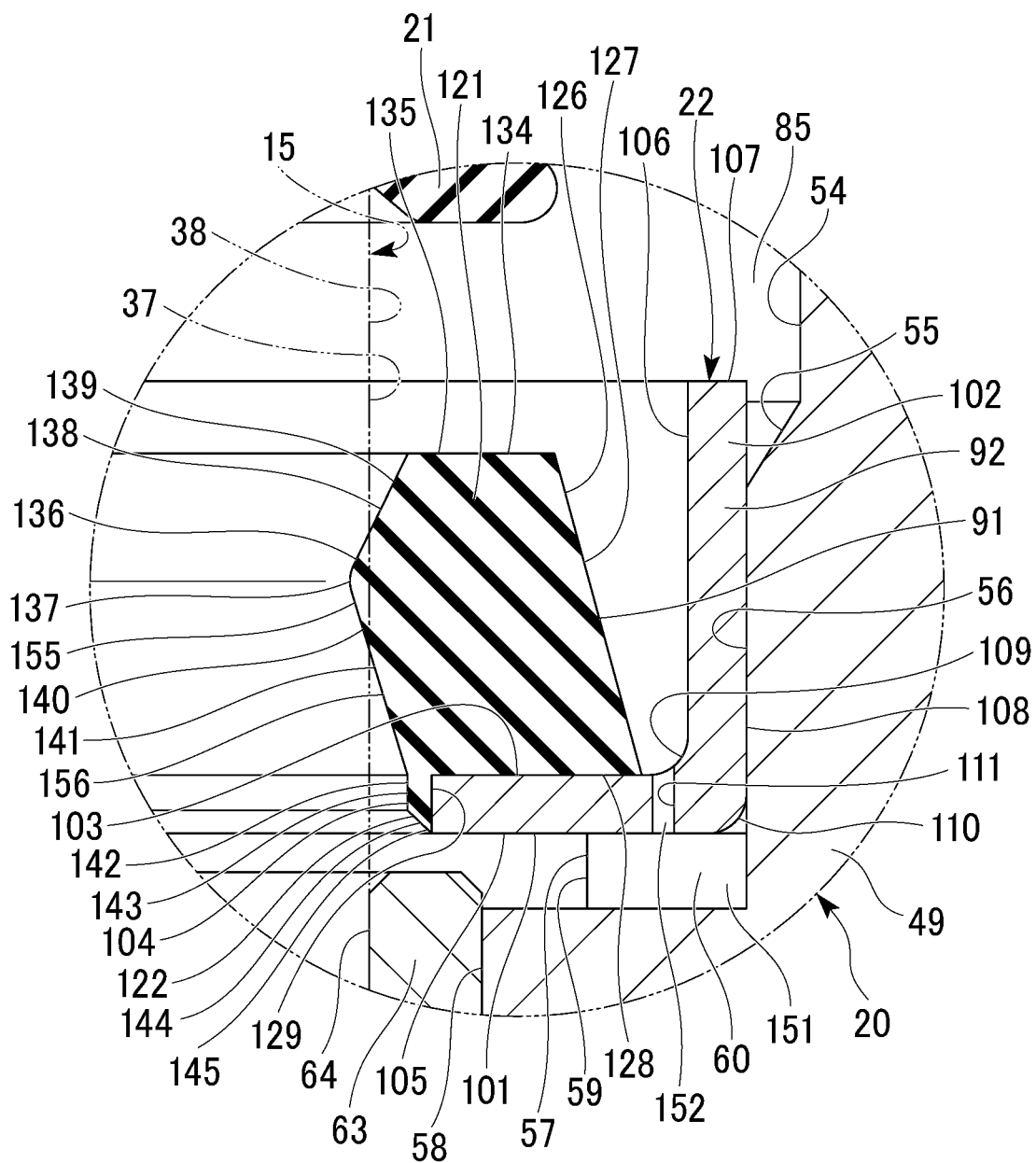
FIG. 3 is a one-side cross-sectional view illustrating a main part of the shock absorber according to the first embodiment of the present invention.

As illustrated in FIG. 3, recessed portions 60 which are recessed outward in the radial direction from a smallest inner diameter portion 59 having the smallest inner diameter in the small diameter hole portion 57 are formed in the small diameter hole portion 57 having a different shape. The recessed portions 60 are recessed outward in the radial direction to places in the vicinity of an inner circumferential surface of the intermediate diameter hole portion 56. A plurality of recessed portions 60 are formed at intervals in a circumferential direction of the small diameter hole portion 57.

As illustrated in FIG. 2, an annular projecting portion 61 having a toric shape is formed at an end portion of the rod guide main body 49 on the large outer diameter portion 50 side in the axial direction such that it protrudes outward in the axial direction. The largest diameter hole portion 53 is formed on the inner side of this annular projecting portion 61. In the rod guide main body 49, a communication hole 62 penetrating therethrough in the axial direction is formed on the inner diameter side of the annular projecting portion 61. In the communication hole 62, one end side opens inside the largest diameter hole portion 53, and the opposite end side opens on a surface on the intermediate outer diameter portion 52 side of the large outer diameter portion 50. The communication hole 62 communicates with the reservoir chamber 13 between the outer tube 14 and the cylinder 12.

The rod guide 20 is constituted of this rod guide main body 49 and a collar 63 having a cylindrical shape fitted and fixed to the inner circumferential portion of the rod guide main body 49. The collar 63 is formed by coating the inner circumference of a metal cylinder body such as an SPCC material or an SPCE material with a fluororesin impregnated bronze. The collar 63 is fitted into the smallest diameter hole portion 58 of the rod guide main body 49 through press-fitting. In the rod guide 20, the piston rod 15 is inserted through the inside of this collar 63 such that it comes into sliding contact with the outer circumferential surface 37 of the main shaft portion 38. There is no gap between the rod guide main body 49 and the collar 63 due to press-fitting, and the rod guide 20 is not penetrated in the axial direction. In contrast, these can slide between the collar 63 and the piston rod 15. Accordingly, it serves as a communication path 64 penetrating the rod guide 20 in the axial direction to a small degree.

The seal member 21 is disposed at a one end portion of the outer tube 14 in the axial direction and comes into press contact with the outer circumferential surface 37 of the main shaft portion 38 of the piston rod 15 in the inner circumferential portion thereof. The seal member 21 restricts leakage to the outer side, such as a hydraulic fluid leaking out from a gap between the rod guide 20 and the main shaft portion 38 of the piston rod 15. FIG. 2 illustrates the rod guide 20 side of the shock absorber 11 in a state in which the piston rod 15 is excluded. Thus, the seal member 21 is in a natural state before the piston rod 15 is inserted therethrough. Further, the outer circumferential surface 37 of the main shaft portion 38 of the piston rod 15 in the case of being inserted through is indicated by an imaginary line (two-dot dashed line).

The seal member 21 is constituted of an oil seal main body 67 (integrated component) which is constituted of a seal portion 65 formed of an elastic rubber material such as a nitrile rubber or a fluororubber having favorable sliding properties and an annular metal member 66 having a toric shape embedded inside the seal portion 65, maintaining the shape of the seal member 21, and obtaining strength for fixing; an annular spring 68 which is fitted to the outer circumferential portion of the seal portion 65 of the oil seal main body 67 on an outward side in the cylinder inward/outward direction; and an annular spring 69 which is fitted to the outer circumferential portion of the seal portion 65 on an inward side in the cylinder inward/outward direction.

Part of the seal portion 65 on an inward side in the radial direction has a dust lip 72 having a toric tubular shape extending in a direction in which it is separated from the annular member 66 in the axial direction from an outward side in the cylinder inward/outward direction on the inner circumferential side of the annular member 66, and an oil lip 73 having a toric tubular shape extending in a direction in which it is separated from the annular member 66 in the axial direction from an inward side in the cylinder inward/outward direction on the inner circumferential side of the annular member 66. In addition, a part of the seal portion 65 on an outward side in the radial direction has an outer circumferential seal 74 covering an outer circumferential surface of the annular member 66 at an outer end position thereof, and a seal lip 75 having a toric shape protruding from the outer circumferential seal 74 to an inward side in the cylinder inward/outward direction.

The dust lip 72 has a tapered tubular shape in its entirety having a smaller inner diameter as it is separated from the annular member 66 to an outward side in the cylinder inward/outward direction. An annular groove 78 for fitting the foregoing spring 68 is formed in the outer circumferential portion of the dust lip 72 such that it is recessed inward in the radial direction. In the present embodiment, an example using the spring 68 has been described, but this is not essential.

The oil lip 73 has a tapered tubular shape in its entirety having a smaller diameter as it is separated from the annular member 66 to an inward side in the cylinder inward/outward direction. An annular groove 79 for fitting the foregoing spring 69 is formed in the outer circumferential portion of the oil lip 73 such that it is recessed inward in the radial direction.

The seal member 21 comes into sealing contact with the inner circumferential portion of the body member 25 of the outer tube 14 in the outer circumferential seal 74 in a state in which the dust lip 72 is disposed on an atmosphere side that is, on an outward side in the cylinder inward/outward direction and the oil lip 73 is disposed on an inward side in the cylinder inward/outward direction. In this state, the position of the annular member 66 is sandwiched and interlocked between the annular projecting portion 61 of the rod guide 20 and the caulked interlock portion 28 of the outer tube 14. At this time, in the seal member 21, the seal lip 75 is disposed between the annular projecting portion 61 of the rod guide 20 and the outer tube 14 and comes into sealing contact therewith. In addition, the oil lip 73 is disposed inside the large diameter hole portion 54 of the rod guide 20 with a gap therebetween in the radial direction.

The main shaft portion 38 of the piston rod 15 is inserted through the inner side of the dust lip 72 and the oil lip 73 in the seal member 21 in a state of being attached to the outer tube 14.

In this state, one end of the piston rod 15 protrudes from one end of the cylinder 12 and the outer tube 14, the dust lip 72 is provided on one end side where the piston rod 15 of the outer tube 14 protrudes, and the oil lip 73 is provided on an inward side in the cylinder inward/outward direction from the dust lip 72.

The spring 68 fitted into the annular groove 78 of the dust lip 72 maintains a fastening force in a constant state in an adhering direction to the piston rod 15 of the dust lip 72. In addition, the spring 68 is also used for adjusting a fastening force for satisfying a design specification. The spring 69 fitted into the annular groove 79 of the oil lip 73 adjusts a fastening force in the adhering direction to the piston rod 15 of the oil lip 73.

In the foregoing seal member 21, the dust lip 72 adheres to the piston rod 15 and retains airtightness due to an interference thereof and a binding force of the spring 68. In the seal member 21, this dust lip 72 mainly restricts entry of foreign materials adhered to the piston rod 15 at the time of being exposed to the outside. In addition, the oil lip 73 also adheres to the piston rod 15 and retains airtightness due to an interference thereof and a binding force of the spring 69. The oil lip 73 scrapes off a hydraulic fluid adhered to the piston rod 15 at the time of going out of the piston rod 15 and restricts leakage to the outside thereof. The oil lip 73 stores a hydraulic fluid mainly in a chamber 85 (low pressure chamber) formed by the large diameter hole portion 54 on an inward side in the cylinder inward/outward direction from the seal member 21. In particular, the chamber 85 is an oil storage chamber for storing a hydraulic fluid. The chamber 85 communicates with the reservoir chamber 13 at all times via the communication hole 62 of the rod guide 20. The pressure in the chamber 85 is the same as that in the reservoir chamber 13.

The friction generating member 22 is fitted into the intermediate diameter hole portion 56 of the rod guide main body 49 through press-fitting. At that time, the friction generating member 22 abuts a bottom portion of the intermediate diameter hole portion 56. The friction generating member 22 is disposed on an inward side in the cylinder inward/outward direction from the seal member 21, that is, on the inner side of the cylinder 12 and the outer tube 14. The friction generating member 22 comes into press contact with the outer circumferential surface 37 of the main shaft portion 38 of the piston rod 15 in the inner circumferential portion thereof. Thus, the friction generating member 22 generates a frictional resistance to the piston rod 15. FIGS. 2 and 3 illustrate states in which the piston rod 15 is excluded, and the friction generating member 22 is also in a natural state before the piston rod 15 is inserted therethrough. Further, the outer circumferential surface 37 of the main shaft portion 38 of the piston rod 15 in the case of being inserted through is indicated by an imaginary line (two-dot dashed line).

As illustrated in FIG. 2, the friction generating member 22 is an integrated component constituted of an annular elastic rubber portion 91 which is formed of an elastic rubber material such as a nitrile rubber or a fluororubber, and an annular metal base portion 92 to which the elastic rubber portion 91 is fixedly attached. The friction generating member 22 is fitted into the intermediate diameter hole portion 56 of the rod guide 20 in the base portion 92. The friction generating member 22 comes into sliding contact with the outer circumferential surface 37 of the main shaft portion 38 of the piston rod 15 in the elastic rubber portion 91. The base portion 92 maintains the shape of the elastic rubber portion 91 and obtains strength for fixing to the rod guide 20.

With reference to FIG. 3, the friction generating member 22 in a natural state will be described. As illustrated in the one-side cross section of FIG. 3, in the friction generating member 22, the base portion 92 has a bottomed cylindrical shape constituted of an annular disk portion 101 having a perforated flat disk plate shape and a tubular fixing portion 102 extending from the outer circumferential side of the annular disk portion 101 to one side in the axial direction. The fixing portion 102 extends in the axial direction while having the annular disk portion 101 side as a base end and is formed in a state of being coaxial with the annular disk portion 101. The fixing portion 102 extends to only one side in the axial direction from the outer circumferential side of the annular disk portion 101. The center axes of the annular disk portion 101 and the fixing portion 102 coincide with each other, and the fixing portion 102 extends so as to be perpendicular to the annular disk portion 101. For example, in the base portion 92, the fixing portion 102 is formed of a flat plate-shaped material through plastic deformation or the annular disk portion 101 is formed of a cylindrical material through plastic deformation.

The annular disk portion 101 has an inner bottom surface 103 constituted of a circular flat surface on the fixing portion 102 side in the axial direction, an inner circumferential surface 104 constituted of a cylinder surface on a side opposite to the fixing portion 102 in the radial direction, and an outer bottom surface 105 constituted of a circular flat surface on a side opposite to the fixing portion 102 in the axial direction. The inner circumferential end portion of the inner bottom surface 103 is connected to the one end portion on the inner circumferential surface 104 in the axial direction. The inner circumferential end portion on the outer bottom surface 105 is connected to the opposite end portion on the inner circumferential surface 104 in the axial direction.

The fixing portion 102 has an inner circumferential surface 106 constituted of a cylinder surface on the annular disk portion 101 side in the radial direction, a distal end surface 107 constituted of a circular flat surface on a side opposite to the annular disk portion 101 in the axial direction, and an outer circumferential surface 108 constituted of a cylinder surface on a side opposite to the annular disk portion 101 in the radial direction. The end portion on the inner circumferential surface 106 on a side opposite to the annular disk portion 101 in the axial direction is connected to the inner diameter portion on the distal end surface 107. The end portion on the outer circumferential surface 108 on a side opposite to the annular disk portion 101 in the axial direction is connected to the outer diameter portion on the distal end surface 107. The annular disk portion 101 has an inner side rounded chamfer 109 having a tonic shape on a side where the inner bottom surface 103 and the inner circumferential surface 106 are close to each other and also has an outer side rounded chamfer 110 having a tonic shape a side where the outer bottom surface 105 and the outer circumferential surface 108 are close to each other.

In the base portion 92, the center axis lines of the inner bottom surface 103, the inner circumferential surface 104, the outer bottom surface 105, the inner circumferential surface 106, the distal end surface 107, the outer circumferential surface 108, the inner side rounded chamfer 109, and the outer side rounded chamfer 110 coincide with each other. The inner bottom surface 103, the outer bottom surface 105, and the distal end surface 107 expand such that they are orthogonal to the center axis lines. In the base portion 92, an inner side end having the smallest diameter serves as the inner circumferential surface 104 of the annular disk portion 101.

Penetration holes 111 penetrating the outer bottom surface 105 from the inner bottom surface 103 side of the inner side rounded chamfer 109 are formed in the annular disk portion 101 of the base portion 92. The penetration holes 111 are parallel to the center axis lines of the annular disk portion 101 and the fixing portion 102, that is, the center axis line of the base portion 92 and are parallel to the center axis line of the friction generating member 22. A plurality of penetration holes 111 are formed at equal intervals in the circumferential direction of the annular disk portion 101.

The elastic rubber portion 91 has a tonic shape having a center axis which coincides with that of the base portion 92. The elastic rubber portion 91 has a main body portion 121 which is disposed so as to be separated inward in the radial direction from the fixing portion 102 of the base portion 92 and is formed on the fixing portion 102 side of the annular disk portion 101 in the axial direction, and an inner side coated portion 122 which protrudes outward in the axial direction from the end portion of the inner circumferential portion of the main body portion 121 on the annular disk portion 101 in the axial direction side and is formed on the inner circumferential side of the annular disk portion 101.

In the main body portion 121, an outer circumferential portion 127 having an outer circumferential surface 126 is separated inward in the radial direction from the inner circumferential surface 106 of the fixing portion 102 of the base portion 92 throughout the entire surface. The main body portion 121 is positioned on an inward side in the radial direction of the base portion 92 from the penetration holes 111 of the annular disk portion 101 of the base portion 92. The main body portion 121 is fixedly attached to the inner bottom surface 103 of the annular disk portion 101 of the base portion 92 on a base end side fixing-attachment surface 128 connected to one side of the outer circumferential surface 126 in the axial direction. The outer circumferential surface 126 has a tapered shape increasing in diameter toward the base end side fixing-attachment surface 128 side in the axial direction. The outer circumferential surface 126 is exposed without being fixedly attached to the base portion 92. Thus, the elastic rubber portion 91 overlaps the inner circumferential side of the tubular fixing portion 102 in the axial direction and is provided so as to be separated in the radial direction in its entirety.

The inner side coated portion 122 is fixedly attached to the inner circumferential surface 104 of the annular disk portion 101 of the base portion 92 on an inner circumference fixing-attachment surface 129 connected to a side opposite to the outer circumferential surface 126 on the base end side fixing-attachment surface 128. In the elastic rubber portion 91, a part which comes into contact with the base portion 92 is fixedly attached to the base portion 92 throughout the entire surface. The elastic rubber portion 91 is fixedly attached to only the annular disk portion 101 thereof with respect to the base portion 92.

The elastic rubber portion 91 has a distal end portion 135 including a distal end surface 134 which is exposed without being fixedly attached to the base portion 92 in a direction opposite to the base end side fixing-attachment surface 128 of the main body portion 121 in the axial direction.

In the elastic rubber portion 91, an inner circumferential portion 136 thereof is also exposed to the base portion 92 without being fixedly attached. The inner circumferential portion 136 of the elastic rubber portion 91 has a smallest inner diameter portion 137 which has the smallest diameter in the elastic rubber portion 91 and also has the smallest diameter in the friction generating member 22, a distal end side tapered portion 139 which has a tapered inner circumferential surface 138 expanding while increasing in diameter as it is separated from the smallest inner diameter portion 137 toward the distal end surface 134 side in the axial direction from the smallest inner diameter portion 137, and a tapered base end side tapered portion 141 which has a tapered inner circumferential surface 140 expanding while increasing in diameter as it is separated from the smallest inner diameter portion 137 toward a side opposite to the distal end surface 134 in the axial direction from the smallest inner diameter portion 137.

The smallest inner diameter portion 137, the distal end side tapered portion 139, and the base end side tapered portion 141 are formed in the main body portion 121.

In the elastic rubber portion 91, the inner circumferential portion 136 thereof has a uniform diameter portion 143 which has a cylinder surface-shaped inner circumferential surface 142 connected to a side opposite to the smallest inner diameter portion 137 on the inner circumferential surface 140, and a tapered portion 145 which has a tapered inner circumferential surface 144 increasing in diameter as it is separated from the inner circumferential surface 142 on a side opposite to the inner circumferential surface 140 on the inner circumferential surface 142. The inner circumferential surface 144 is connected to the outer bottom surface 105 of the annular disk portion 101. The uniform diameter portion 143 and the tapered portion 145 are formed in the inner side coated portion 122.

In other words, in the elastic rubber portion 91, the smallest inner diameter portion 137, the distal end side tapered portion 139 and the base end side tapered portion 141 on both sides of the smallest inner diameter portion 137 in the axial direction, the uniform diameter portion 143, and the tapered portion 145 are provided on the inner circumferential side. A boundary part between the distal end side tapered portion 139 and the base end side tapered portion 141 serves as the smallest inner diameter portion 137. Regarding the distal end side tapered portion 139 and the base end side tapered portion 141, the distal end side tapered portion 139 is disposed on a side far from the annular disk portion 101 of the base portion 92 and the base end side tapered portion 141 is disposed on a side close to the annular disk portion 101 in the axial direction of the elastic rubber portion 91. Moreover, in other words, in the elastic rubber portion 91, the smallest inner diameter portion 137, the distal end side tapered portion 139 expanding while increasing in diameter toward a side opposite to the one side chamber 16 in the axial direction from the smallest inner diameter portion 137, and the base end side tapered portion 141 expanding while increasing in diameter toward the one side chamber 16 in the axial direction from the smallest inner diameter portion 137 are provided on the inner circumferential side.

All of the smallest inner diameter portion 137, the distal end side tapered portion 139, the base end side tapered portion 141, the uniform diameter portion 143, and the tapered portion 145 have a toric shape continuous throughout the entire circumference in the circumferential direction of the elastic rubber portion 91. Since the elastic rubber portion 91 has a center axis which coincides with that of the base portion 92, the outer circumferential surface 126, the distal end surface 134, the inner circumferential surface 138, the smallest inner diameter portion 137, the inner circumferential surface 140, the inner circumferential surface 142, and the inner circumferential surface 144 have a center axis which coincides with that of the base portion 92.

As illustrated in FIG. 2, the friction generating member 22 having the foregoing structure is fitted and fixed to the intermediate diameter hole portion 56 (fixing target part) through press-fitting from the large diameter hole portion 54 side of the rod guide 20 in a posture in which the annular disk portion 101 of the base portion 92 is positioned on an inward side in the cylinder inward/outward direction from the fixing portion 102. At this time, as illustrated in FIG. 3, in the friction generating member 22, the fixing portion 102 of the base portion 92 is fitted to the inner circumferential surface of the intermediate diameter hole portion 56 on the outer circumferential surface 108, and the annular disk portion 101 abuts the bottom surface of the bottom portion of the intermediate diameter hole portion 56 on the outer bottom surface 105. At that time, communication is realized by the penetration holes 111 by aligning the positions thereof with those of the recessed portions 60 in the circumferential direction of the rod guide main body 49. The base portion 92 has the tubular fixing portion 102 for fixing the friction generating member 22 to the intermediate diameter hole portion 56 of the rod guide 20 (target part).

In the inner circumferential portion 136 of the elastic rubber portion 91, the distal end side tapered portion 139 is disposed on an outward side in the cylinder inward/outward direction from the smallest inner diameter portion 137, and the base end side tapered portion 141 is disposed on an inward side in the cylinder inward/outward direction from the smallest inner diameter portion 137.

In the friction generating member 22, the inner diameter of the smallest inner diameter portion 137 is smaller than the outer diameter of the main shaft portion 38 of the piston rod 15, that is, the diameter of the outer circumferential surface 37. Thus, the main shaft portion 38 of the piston rod 15 is inserted through the friction generating member 22 with a predetermined interference on the inner side of the elastic rubber portion 91. As a result, in the friction generating member 22, the elastic rubber portion 91 adheres to the main shaft portion 38 of the piston rod 15 throughout the entire circumference while being elastically deformed on an outward side in the radial direction.

In a state of being fitted to the piston rod 15 in this manner, in the elastic rubber portion 91, the smallest inner diameter portion 137, part of the distal end side tapered portion 139 on the smallest inner diameter portion 137 side, and part of the base end side tapered portion 141 on the smallest inner diameter portion 137 side serve as a lip portion 155 which comes into sliding contact with the main shaft portion 38 of the piston rod 15. In other words, the lip portion 155 which comes into sliding contact with the piston rod 15 is formed in the elastic rubber portion 91.

The friction generating member 22 in a state of being fitted to the piston rod 15, the piston rod 15, the bottom portion and the plurality of recessed portions 60 of the small diameter hole portion 57 of the rod guide main body 49, and the collar 63 form a chamber 151. At that time, in the friction generating member 22, the inner circumferential surface 140 of the base end side tapered portion 141 thereof, the inner circumferential surface 142 of the uniform diameter portion 143, the inner circumferential surface 144 of the tapered portion 145, and the outer bottom surface 105 of the annular disk portion 101 form the chamber 151. In the elastic rubber portion 91, the remaining part which does not form the lip portion 155 on a side opposite to the smallest inner diameter portion 137 of the base end side tapered portion 141 serves as a pressure receiving portion 156 which receives the pressures in the chamber 151 and the one side chamber 16 communicating therewith via the communication path 64 in the radial direction. Thus, on the inner circumferential side of the elastic rubber portion 91, the lip portion 155 is formed on the seal member 21 side, and the pressure receiving portion 156 receiving the pressure in the one side chamber 16 is formed on the one side chamber 16 side.

In the friction generating member 22 in a state of being fitted to the piston rod 15, the inner circumferential surface 138 of the distal end side tapered portion 139 of the elastic rubber portion 91 thereof, the distal end surface 134 of the distal end portion 135, the outer circumferential surface 126 of the outer circumferential portion 127, the inner circumferential surface 106 of the fixing portion 102, and part of the distal end surface 107 and the outer circumferential surface 108 on the distal end surface 107 side form the chamber 85.

Meanwhile, the chamber 151 communicates with the one side chamber 16 via the communication path 64 between the collar 63 and the piston rod 15. On the other hand, the chamber 151 communicates with the chamber 85 and the reservoir chamber 13 via communication paths 152 inside the penetration holes 111 of the friction generating member 22. The flow channel cross-sectional areas of the communication paths 152 are smaller than the flow channel cross-sectional area of the communication path 64. Thus, a pressure loss due to the communication paths 152 becomes higher than a pressure loss due to the communication path 64. Since the communication paths 152 allow the one side chamber 16, the chamber 151, and the chamber 85 to communicate with each other at all times, a hydraulic fluid in the one side chamber 16 is supplied to the chamber 85. Accordingly, the communication paths 152 prevent galling due to poor lubrication of the seal member 21. In addition, the communication paths 152 discharge air incorporated into the one side chamber 16.

In the shock absorber 11, when the piston rod 15 moves to the extension side where the overall length of the shock absorber 11 extends, the piston 18 moves to the one side chamber 16 side, and the pressure in the one side chamber 16 rises, the pressure in the chamber 151 also becomes high via the communication path 64. However, rising of the pressure in the chamber 85 via the communication paths 152 having a high pressure loss may be in a delayed state. At this time, the upstream side of the elastic rubber portion 91 in the flowing direction of a hydraulic fluid becomes the chamber 151 and the downstream side thereof becomes the chamber 85. Further, the chamber 85 between the downstream side of the elastic rubber portion 91 and the reservoir chamber 13 is under an internal pressure lower than the internal pressures in the one side chamber 16 and the chamber 151. Regarding the relationship between the passage areas of the communication paths 152 and the communication path 64, the communication paths 152 are greater than the communication path 64. The communication paths 152 are not necessarily.

In the elastic rubber portion 91, the pressure receiving portion 156 of the base end side tapered portion 141 mainly receives a force outward in the radial direction due to the differential pressures generated in this manner between the one side chamber 16 and the chamber 151, and the chamber 85 and the reservoir chamber 13. Further, in the elastic rubber portion 91, when the differential pressures generated in this manner between the one side chamber 16 and the chamber 151, and the chamber 85 and the reservoir chamber 13 reach a predetermined pressure, the pressure receiving portion 156 of the base end side tapered portion 141 is deformed outward in the radial direction due to the received pressure, a gap in the radial direction is generated between the pressure receiving portion 156 and the piston rod 15, and thus the chamber 151 on the upstream side and the chamber 85 on the downstream side communicate with each other via this gap. That is, the elastic rubber portion 91 is formed such that the chamber 151 on the upstream side and the chamber 85 on the downstream side can communicate with each other when the differential pressure between the one side chamber 16 and the reservoir chamber 13 reaches a predetermined pressure.

In the shock absorber 11 of the first embodiment described above, when the piston rod 15 moves to the extension side, a damping force of orifice characteristics due to a fixing orifice (not illustrated) is generated in a region of a low piston speed, and the disk valve 42 is separated from the piston 18 and generates a damping force of valve characteristics in a region of a high piston speed. In addition, when the piston rod 15 moves to the contraction side, a damping force of orifice characteristics due to a fixing orifice (not illustrated) is generated in a region of a low piston speed, and the disk valve 41 is separated from the piston 18 and generates a damping force of valve characteristics in a region of a high piston speed.

Here, with respect to a hydraulic damping region generating a hydraulic damping force due to a fixing orifice (not illustrated) and the disk valves 41 and 42 described above, in an extremely low speed region of a lower piston speed, basically, a damping force due to a fixing orifice (not illustrated) and the disk valves 41 and 42 is seldom generated. For this reason, a frictional resistance to the piston rod 15 by the seal member 21 and the friction generating member 22 and a frictional resistance of the piston 18 to the cylinder 12 become main generation sources of a damping force.

The foregoing Patent Document 1 describes a fluid pressure shock absorber in which a friction generating member which comes into sliding contact with a piston rod is provided and a communication path allowing both sides of this friction generating member in the axial direction to communicate with each other is provided. In this fluid pressure shock absorber, since a communication path allowing both sides of the friction generating member in the axial direction to communicate with each other is provided, basically, both sides of the friction generating member in the axial direction are maintained under the same pressure.

Incidentally, in a shock absorber, there is a demand that a frictional force due to the friction generating member is generated without generating a hydraulic damping force in a minute amplitude region in which amplitudes of the piston rod and the piston are extremely minute and generation of a frictional force is curbed in an ordinary region in which the amplitudes of the piston rod and the piston becomes larger than that in the minute amplitude region (the foregoing hydraulic damping region). This is because there is a probability of impairment of riding quality of a vehicle in which this shock absorber is used in a suspension device in a shock absorber in which a frictional force due to the friction generating member is significant in an ordinary region. Since an axial force due to a slide resistance (hereinafter, a sliding force) is generated by the friction generating member, the piston speed which is insufficient in an ordinary shock absorber supplements a damper axis force in an extremely low speed region, and thus riding quality and steering stability can be improved. However, a sliding force of the friction generating member is evenly generated without depending on the piston speed of the shock absorber in regions other than an extremely low speed region. Therefore, there is a probability of impairment of stroke feeling or the like of the shock absorber and deterioration in riding quality.

In the shock absorber 11 of the first embodiment, in the minute amplitude regions of the piston rod 15 and the piston 18 in which a hydraulic damping force is not generated, since the pressures in the one side chamber 16 and the reservoir chamber 13 are approximately equivalent to each other, the lip portion 155 of the elastic rubber portion 91 of the friction generating member 22 comes into contact with the main shaft portion 38 of the piston rod 15 in a binding state. Thus, the friction generating member 22 generates a high slide resistance to the piston rod 15.

In contrast, in an extension stroke and a contraction stroke in an ordinary region (the foregoing hydraulic damping region) having a larger amplitude than the minute amplitude region, the piston speed increases, the pressure in the one side chamber 16 becomes higher than the pressure in the reservoir chamber 13, and the pressure in the chamber 151 communicating with the one side chamber 16 via the communication path 64 also increases in a similar manner. In contrast, the pressure in the chamber 85 communicating with the chamber 151 via the communication paths 152 having a high pressure loss does not increase, and the chamber 85 is under an internal pressure lower than the internal pressures in the one side chamber 16 and the chamber 151. At this time, the chamber 85 between the downstream side of the elastic rubber portion 91 and the reservoir chamber 13 becomes a low pressure chamber under an internal pressure lower than the internal pressure in the one side chamber 16.

The elastic rubber portion 91 receives the pressures in the one side chamber 16 and the chamber 151 which are generated in this manner and are higher than those in the chamber 85 and the reservoir chamber 13 in the pressure receiving portion 156 on the one side chamber 16 side of the lip portion 155 which comes into sliding contact with the piston rod 15 and is deformed outward in the radial direction so that a binding force with respect to the main shaft portion 38 of the piston rod 15 is reduced and a slide resistance decreases. In other words, the elastic rubber portion 91 receives a force outward in the radial direction due to the differential pressures between the one side chamber 16 and the chamber 151, and the chamber 85 and the reservoir chamber 13 so that a binding force with respect to the main shaft portion 38 of the piston rod 15 is reduced and a slide resistance decreases.

When the piston speed further increases and the differential pressures between the one side chamber 16 and the chamber 151, and the chamber 85 and the reservoir chamber 13 reach a predetermined pressure, the elastic rubber portion 91 is separated from the main shaft portion 38 of the piston rod 15 in the radial direction and allows the one side chamber 16 and the chamber 151 on the upstream side and the chamber 85 and the reservoir chamber 13 on the downstream side in the flowing direction of a hydraulic fluid to communicate with each other. At this time, there is no longer any slide resistance to the piston rod 15.

In this manner, when the friction generating member 22 generates a sliding force corresponding to the piston speed with respect to the piston rod 15, favorable working characteristics can be obtained, and deterioration in riding quality performance of a vehicle using this shock absorber 11 due to an excessive sliding force can be curbed.

That is, in order to achieve favorable riding quality and steering stability, in the shock absorber 11, in a region of an extremely low piston speed in which an axial force (hereinafter, an oil pressure force) due to a pressure loss by a working fluid is seldom generated, the friction generating member 22 can apply an appropriate sliding force to the piston rod 15. Meanwhile, in a region in which the piston speed increases and an oil pressure force is generated (the foregoing hydraulic damping region), a sliding force with respect to the piston rod 15 of the friction generating member 22 can be curbed low. In this manner, the shock absorber 11 can generate a necessary sliding force in an extremely low speed region and can reduce a sliding force in a region in which an oil pressure force is generated. In other words, a necessary sliding force can be generated in an extremely low speed region, and a sliding force can be reduced in a region in which an oil pressure force is generated. Accordingly, favorable working characteristics can be obtained, and deterioration in riding quality performance of a vehicle using this shock absorber 11 can be curbed.

In addition, as described above, since the chamber 85 between the downstream side of the elastic rubber portion 91 and the reservoir chamber 13 becomes a low pressure chamber under an internal pressure lower than the internal pressure in the one side chamber 16, the foregoing differential pressure can be favorably generated in the elastic rubber portion 91.

In addition, since the chamber 85 communicates with the reservoir chamber 13, the chamber 85 can be maintained under a low pressure, and the foregoing differential pressure can be favorably generated in the elastic rubber portion 91.

In addition, since the lip portion 155 which comes into sliding contact with the piston rod 15 is formed in the elastic rubber portion 91, a frictional force can be favorably generated when a frictional force is generated.

In addition, the lip portion 155 which comes into sliding contact with the piston rod 15 is formed on the seal member 21 side on the inner circumferential side of the elastic rubber portion 91 in the axial direction. The pressure receiving portion 156 receiving the pressure in the one side chamber 16 via the chamber 151 is formed on the one side chamber 16 side on the inner circumferential side of the elastic rubber portion 91 in the axial direction. For this reason, the elastic rubber portion 91 can have a compact structure.

Second Embodiment

Next, a second embodiment according to the present invention will be described focusing on parts different from those in the first embodiment mainly on the basis of FIGS. 4 and 5. Parts common to the first embodiment will be expressed by the same names and the same reference signs.

In a shock absorber 11A of the second embodiment, a friction generating member 22A is provided in place of the friction generating member 22 in the first embodiment, and a rod guide 20A having a rod guide main body 49A which is partially different from the rod guide main body 49 is provided in place of the rod guide 20 in the first embodiment. FIGS. 4 and 5 also illustrate the friction generating member 22A in a natural state before the piston rod 15 is inserted through, and the outer circumferential surface 37 of the main shaft portion 38 of the piston rod 15 in the case of being inserted through is indicated by an imaginary line (two-dot dashed line).

The friction generating member 22A is provided on an inward side in the cylinder inward/outward direction from the seal member 21 and between the seal member 21 and the rod guide 20A. The friction generating member 22A has an annular shape and the piston rod 15 is inserted through the inner side thereof such that it can slide. The friction generating member 22A is fitted and fixed to the rod guide 20A in the outer circumferential portion thereof. In the friction generating member 22A, the inner circumferential portion comes into sliding contact with the outer circumferential portion of the piston rod 15, and a frictional resistance is generated in the piston rod 15. The friction generating member 22A is not intended for sealing and is provided at a position on a side defined by the seal member 21 in the cylinder 12.

The rod guide main body 49A has a small diameter hole portion 57A which is partially different from the small diameter hole portion 57 in the first embodiment. The small diameter hole portion 57A has no recessed portion 60 formed therein and has a circular shape with a smaller diameter than the intermediate diameter hole portion 56 and a larger diameter than the smallest diameter hole portion 58.

The friction generating member 22A is fitted into the intermediate diameter hole portion 56 of the rod guide main body 49A of the rod guide 20A through press-fitting. At that time, the friction generating member 22A abuts the bottom surface of the bottom portion of the intermediate diameter hole portion 56. The friction generating member 22A is disposed on an inward side in the cylinder inward/outward direction from the seal member 21. In the friction generating member 22A, the inner circumferential portion comes into press contact with the outer circumferential surface 37 of the main shaft portion 38 of the piston rod 15 and generates a frictional resistance to the piston rod 15.

Figure 5:
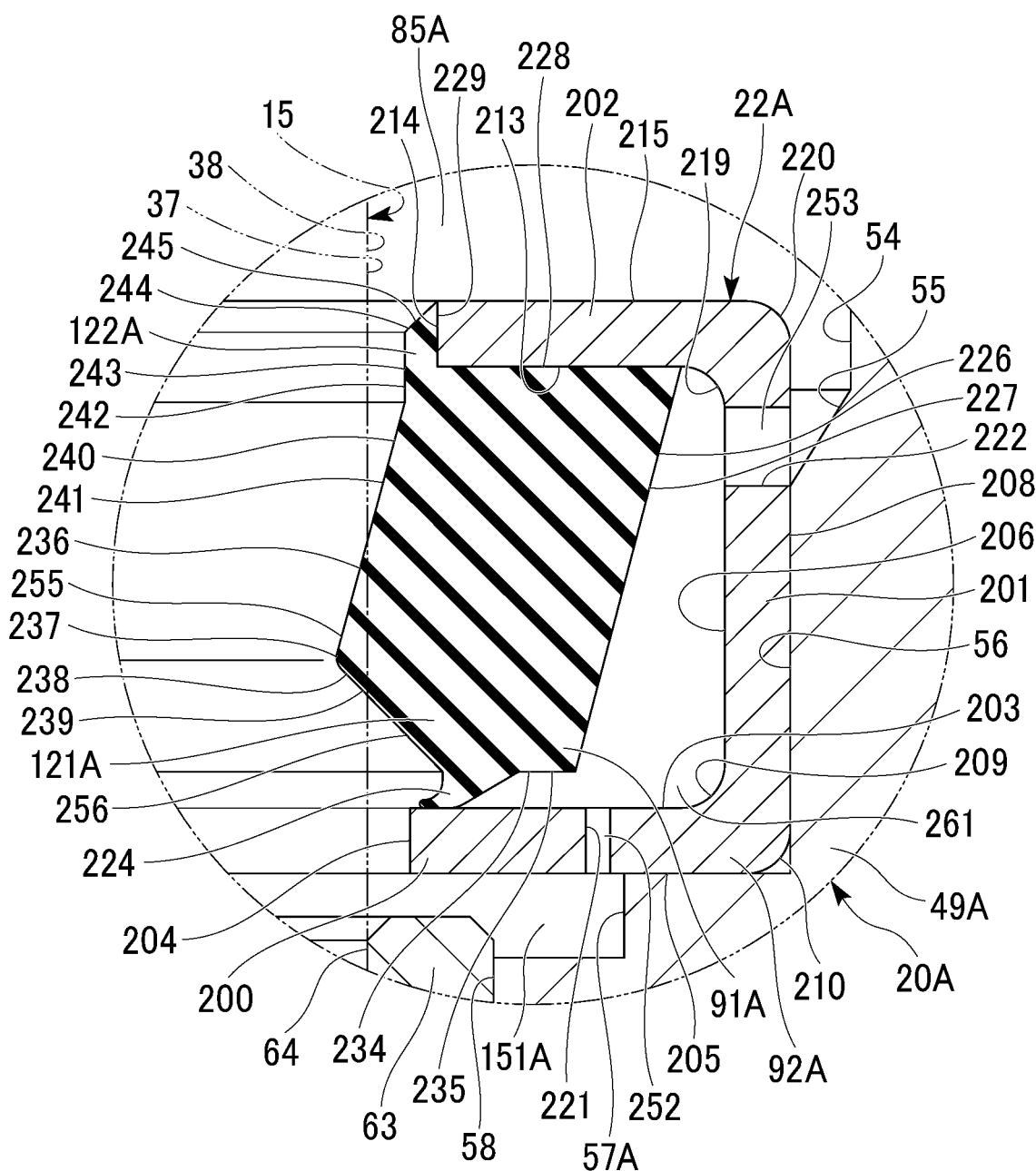
FIG. 5 is a one-side cross-sectional view illustrating a main part of the shock absorber according to the second embodiment of the present invention.

As illustrated in FIG. 5, the friction generating member 22A is an integrated component constituted of an annular elastic rubber portion 91A formed of an elastic rubber material such as a nitrile rubber or a fluororubber and an annular metal base portion 92A to which the elastic rubber portion 91A is fixedly attached. The friction generating member 22A is fitted into the intermediate diameter hole portion 56 of the rod guide 20A in the base portion 92A. The friction generating member 22A comes into sliding contact with the outer circumferential surface 37 of the main shaft portion 38 of the piston rod 15 in the elastic rubber portion 91A. The base portion 92A maintains the shape of the elastic rubber portion 91A and obtains strength for fixing to the rod guide 20A.

The friction generating member 22A in a natural state will be described with reference to FIG. 5. In the friction generating member 22A, the base portion 92A has a cylindrical shape with a bottom and a lid constituted of an annular disk portion 200 having a perforated flat disk plate shape, a tubular fixing portion 201 extending in the axial direction to one side from the outer circumferential side of the annular disk portion 200, and an annular disk portion 202 having a perforated flat disk plate shape expanding inward in the radial direction from a side opposite to the annular disk portion 200 in the axial direction of the fixing portion 201.

The fixing portion 201 extends in the axial direction between the annular disk portions 200 and 202. The fixing portion 201 is formed in a state of being coaxial with the annular disk portions 200 and 202. The center axes of the annular disk portions 200 and 202 and the fixing portion 201 coincide with each other. The annular disk portions 200 and 202 are parallel to each other, and the fixing portion 201 is perpendicular to these. For example, in the base portion 92A, the annular disk portions 200 and 202 are formed of a cylindrical material through plastic deformation.

The annular disk portion 200 has an inner bottom surface 203 constituted of a circular flat surface on the fixing portion 201 side in the axial direction, an inner circumferential surface 204 constituted of a cylinder surface on a side opposite to the fixing portion 201 in the radial direction, and an outer bottom surface 205 constituted of a circular flat surface on a side opposite to the fixing portion 201 in the axial direction. The inner circumferential end portion of the inner bottom surface 203 is connected to the one end portion on the inner circumferential surface 204 in the axial direction, and the inner circumferential end portion on the outer bottom surface 205 is connected to the opposite end portion on the inner circumferential surface 204 in the axial direction.

The fixing portion 201 has an inner circumferential surface 206 constituted of a cylinder surface on the annular disk portion 200 side in the radial direction, and an outer circumferential surface 208 constituted of a cylinder surface on a side opposite to the annular disk portion 200 in the radial direction. The annular disk portion 200 has an inner side rounded chamfer 209 having a toric shape connecting the inner bottom surface 203 and the inner circumferential surface 206 to each other on a side where they are close to each other and also has an outer side rounded chamfer 210 having a toric shape connecting the outer bottom surface 205 and the outer circumferential surface 208 to each other on a side where they are close to each other. In the present embodiment, a constitution having the rounded chamfer 210 is adopted, but this is not essential.

The annular disk portion 202 has an inner bottom surface 213 constituted of a circular flat surface on the fixing portion 201 side in the axial direction, an inner circumferential surface 214 constituted of a cylinder surface on a side opposite to the fixing portion 201 in the radial direction, and an outer bottom surface 215 constituted of a circular flat surface on a side opposite to the fixing portion 201 in the axial direction. The inner circumferential end portion of the inner bottom surface 213 is connected to the one end portion on the inner circumferential surface 214 in the axial direction, and the inner circumferential end portion on the outer bottom surface 215 is connected to the opposite end portion on the inner circumferential surface 214 in the axial direction.

The annular disk portion 202 has an inner side rounded chamfer 219 having a toric shape connecting the inner bottom surface 213 and the inner circumferential surface 206 to each other on a side where they are close to each other and also has an outer side rounded chamfer 220 having a toric shape connecting the outer bottom surface 215 and the outer circumferential surface 208 to each other on a side where they are close to each other.

In the base portion 92A, the center axis lines of the inner bottom surfaces 203 and 213, the inner circumferential surfaces 204 and 214, the outer bottom surfaces 205 and 215, the inner circumferential surface 206, the outer circumferential surface 208, the inner side rounded chamfers 209 and 219, and the outer side rounded chamfers 210 and 220 coincide with each other. The inner bottom surfaces 203 and 213 and the outer bottom surfaces 205 and 215 expand such that they are orthogonal to the center axis lines. The inner circumferential surface 204 also has the smallest diameter in the annular disk portion 200, and the inner circumferential surface 214 also has the smallest diameter in the annular disk portion 202. In the base portion 92A, the inner diameter of the inner circumferential surface 214 of the annular disk portion 202 is larger than the inner diameter of the inner circumferential surface 204 of the annular disk portion 200. Thus, the inner circumferential surface 204 has the smallest diameter in the base portion 92A.

Penetration holes 221 penetrating the outer bottom surface 205 from the inner bottom surface 203 are formed in the annular disk portion 200 of the base portion 92A. The penetration holes 221 are parallel to the center axis lines of the annular disk portions 200 and 202 and the fixing portion 201, that is, the center axis line of the base portion 92A and are parallel to the center axis line of the friction generating member 22A. A plurality of penetration holes 221 are formed at equal intervals in the circumferential direction of the annular disk portion 200. The present embodiment illustrates a constitution in which a plurality of penetration holes 221 are provided, but one penetration hole 221 may be provided.

Penetration holes 222 penetrating the outer circumferential surface 208 from the inner circumferential surface 206 are formed in the fixing portion 201 of the base portion 92A. The penetration holes 222 are formed on the annular disk portion 202 side of the fixing portion 201 in the axial direction and extend in the radial direction of the fixing portion 201. A plurality of penetration holes 222 are formed at equal intervals in the circumferential direction of the fixing portion 201.

The elastic rubber portion 91A has a toric shape having a center axis which coincides with that of the base portion 92A. The elastic rubber portion 91A has a main body portion 121A which is disposed on an inward side in the radial direction of the fixing portion 201 of the base portion 92A and is formed on the fixing portion 201 side of the annular disk portion 202 in the axial direction, an inner side coated portion 122A which protrudes outward in the axial direction from the end portion of the inner circumferential portion of the main body portion 121A on the annular disk portion 202 side in the axial direction and is formed on the inner circumferential side of the annular disk portion 202, and a distal end lip portion 224 which protrudes to a side opposite to the inner side coated portion 122A in the axial direction from the main body portion 121A.

In the main body portion 121A, an outer circumferential portion 227 having an outer circumferential surface 226 is separated inward in the radial direction from the inner circumferential surface 206 of the fixing portion 201 of the base portion 92A throughout the entire surface. The main body portion 121A is fixedly attached to the inner bottom surface 213 of the annular disk portion 202 of the base portion 92A on a base end side fixing-attachment surface 228 connected to one side of the outer circumferential surface 226 in the axial direction. The outer circumferential surface 226 has a tapered shape increasing in diameter toward the base end side fixing-attachment surface 228 side in the axial direction. The outer circumferential surface 226 is exposed without being fixedly attached to the base portion 92A. Thus, the elastic rubber portion 91A overlaps the inner circumferential side of the tubular fixing portion 201 in the axial direction and is provided so as to be separated in the radial direction in its entirety.

The inner side coated portion 122A is fixedly attached to the inner circumferential surface 214 of the annular disk portion 202 on an inner circumference fixing-attachment surface 229 connected to a side opposite to the outer circumferential surface 226 on the base end side fixing-attachment surface 228. In the elastic rubber portion 91A, a part which comes into contact with the annular disk portion 202 is fixedly attached to the base portion 92A throughout the entire surface. The elastic rubber portion 91A is fixedly attached to only the annular disk portion 202 thereof with respect to the base portion 92A.

The elastic rubber portion 91A has a distal end portion 235 including a distal end surface 234 which is exposed without being fixedly attached to the base portion 92A in a direction opposite to the base end side fixing-attachment surface 228 of the main body portion 121A in the axial direction. The distal end portion 235 is positioned on the annular disk portion 202 side in the axial direction from the annular disk portion 200, and the distal end surface 234 faces the inner bottom surface 203.

The elastic rubber portion 91A has the distal end lip portion 224 on a side opposite to the outer circumferential surface 226 in the radial direction from the distal end surface 234 of the distal end portion 235. The distal end lip portion 224 extends to the annular disk portion 200 side in the axial direction from the distal end surface 234 and abuts an inward side in the radial direction from the penetration holes 221 on the inner bottom surface 203 of the annular disk portion 200. The distal end lip portion 224 has a toric shape which abuts the inner bottom surface 203 throughout the entire circumference of the elastic rubber portion 91A in the circumferential direction. The distal end lip portion 224 has a shape decreased in diameter toward an extending distal end side. The distal end lip portion 224 is decreased in thickness in the radial direction toward the extending distal end side.

In the elastic rubber portion 91A, an inner circumferential portion 236 thereof is also exposed to the base portion 92A without being fixedly attached. The inner circumferential portion 236 of the elastic rubber portion 91A has the smallest diameter in the elastic rubber portion 91A. The inner circumferential portion 236 of the elastic rubber portion 91A has a smallest inner diameter portion 237 which has the smallest diameter in the friction generating member 22A, a distal end side tapered portion 239 which has a tapered inner circumferential surface 238 expanding while increasing in diameter as it is separated from the smallest inner diameter portion 237 toward the distal end surface 234 side in the axial direction from the smallest inner diameter portion 237, and a tapered base end side tapered portion 241 which has a tapered inner circumferential surface 240 expanding while increasing in diameter as it is separated from the smallest inner diameter portion 237 toward a side opposite to the distal end surface 234 in the axial direction from the smallest inner diameter portion 237. The smallest inner diameter portion 237, the distal end side tapered portion 239, and the base end side tapered portion 241 are formed in the main body portion 121A. The distal end lip portion 224 is provided between the distal end side tapered portion 239 and the distal end portion 235.

In addition, in the elastic rubber portion 91A, the inner circumferential portion 236 thereof has a uniform diameter portion 243 which has a cylinder surface-shaped inner circumferential surface 242 connected to a side opposite to the smallest inner diameter portion 237 on the inner circumferential surface 240, and a tapered portion 245 which has a tapered inner circumferential surface 244 increasing in diameter as it is separated from the inner circumferential surface 242 on a side opposite to the inner circumferential surface 240 on the inner circumferential surface 242. The inner circumferential surface 244 is connected to the outer bottom surface 215 of the annular disk portion 202.

In other words, in the elastic rubber portion 91A, the smallest inner diameter portion 237, the distal end side tapered portion 239 and the base end side tapered portion 241 on both sides of the smallest inner diameter portion 237 in the axial direction, the uniform diameter portion 243, and the tapered portion 245 are provided on the inner circumferential side. A boundary part between the distal end side tapered portion 239 and the base end side tapered portion 241 serves as the smallest inner diameter portion 237. Regarding the distal end side tapered portion 239 and the base end side tapered portion 241, the distal end side tapered portion 239 is disposed on a side far from the annular disk portion 202 of the base portion 92A and the base end side tapered portion 241 is disposed on a side close to the annular disk portion 202 in the axial direction of the elastic rubber portion 91A. The distal end side tapered portion 239 is disposed on a side close to the annular disk portion 200 of the base portion 92A and the base end side tapered portion 241 is disposed on a side far from the annular disk portion 200. Moreover, in other words, in the elastic rubber portion 91A, the smallest inner diameter portion 237, the distal end side tapered portion 239 expanding while increasing in diameter toward the one side chamber 16 side in the axial direction from the smallest inner diameter portion 237, and the base end side tapered portion 241 expanding while increasing in diameter toward a side opposite to the one side chamber 16 in the axial direction from the smallest inner diameter portion 237 are provided on the inner circumferential side.

All of the smallest inner diameter portion 237, the distal end side tapered portion 239, the base end side tapered portion 241, the uniform diameter portion 243, and the tapered portion 245 have a toric shape continuous throughout the entire circumference in the circumferential direction of the elastic rubber portion 91A. Since the elastic rubber portion 91A has a center axis which coincides with that of the base portion 92A, the outer circumferential surface 226, the distal end surface 234, the inner circumferential surface 238, the smallest inner diameter portion 237, the inner circumferential surface 240, the inner circumferential surface 242, the inner circumferential surface 244, and the distal end lip portion 224 have a center axis which coincides with that of the base portion 92A.

Figure 4:
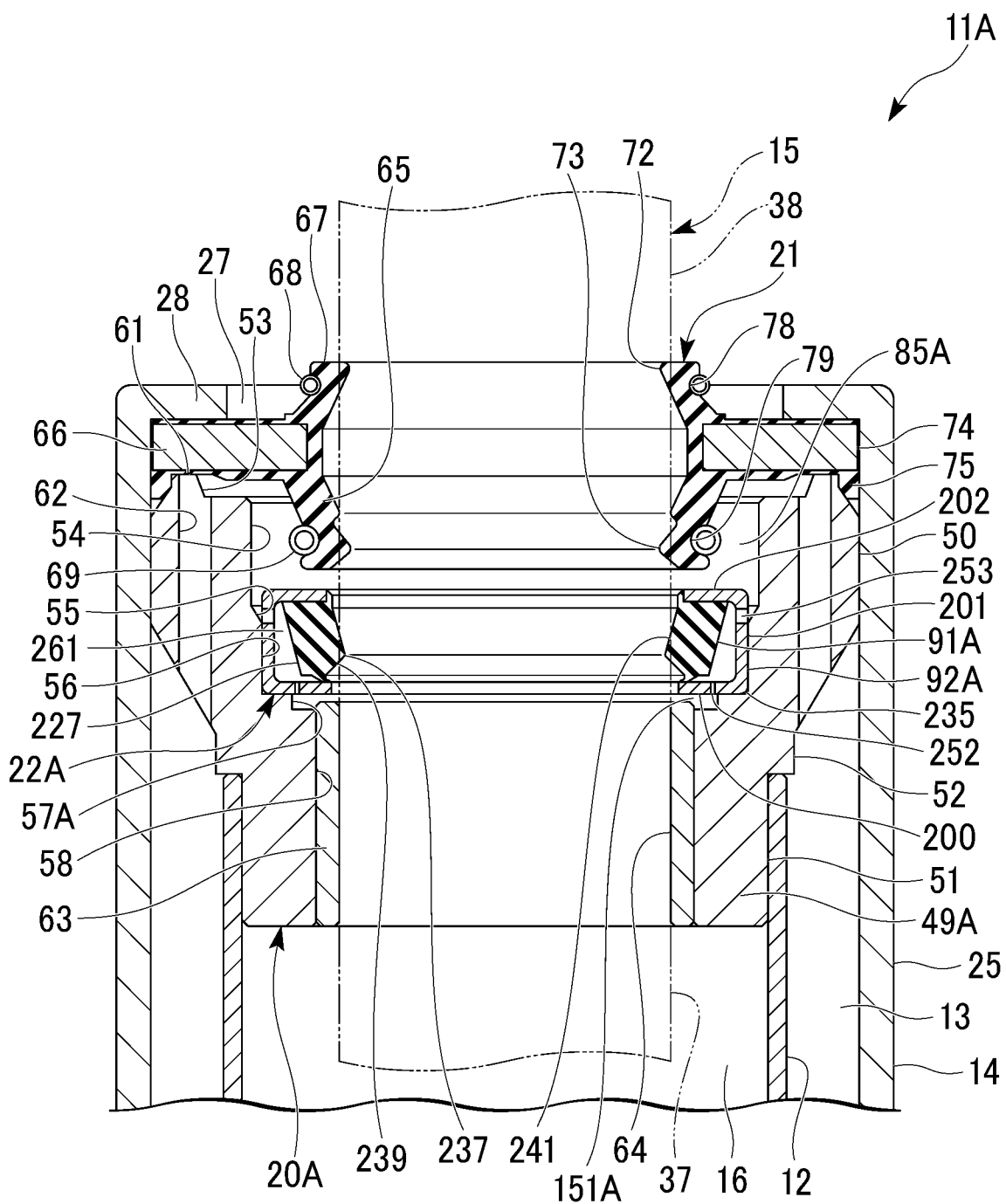
FIG. 4 is a partial cross-sectional view illustrating a piston rod extension side of a shock absorber according to a second embodiment of the present invention.

As illustrated in FIG. 4, the friction generating member 22A having the foregoing structure is fitted and fixed to the intermediate diameter hole portion 56 (fixing target part) through press-fitting from the large diameter hole portion 54 side of the rod guide 20 in a posture in which the annular disk portion 200 of the base portion 92A is positioned on an inward side in the cylinder inward/outward direction and the annular disk portion 202 is positioned on an outward side in the cylinder inward/outward direction. At this time, as illustrated in FIG. 5, in the friction generating member 22A, the fixing portion 201 of the base portion 92A is fitted to the inner circumferential surface of the intermediate diameter hole portion 56 on the outer circumferential surface 208. In the friction generating member 22A, the annular disk portion 200 abuts the bottom surface of the bottom portion of the intermediate diameter hole portion 56 on the outer bottom surface 205. In this state, the penetration holes 221 of the annular disk portion 200 are on an inward side in the radial direction from the inner circumferential surface of the small diameter hole portion 57A. The penetration holes 221 of the annular disk portion 200 open inside the small diameter hole portion 57A. In addition, the penetration holes 222 of the fixing portion 201 open inside the tapered hole portion 55.

On the inner circumferential side of the elastic rubber portion 91A, the distal end side tapered portion 239 is disposed on an inward side in the cylinder inward/outward direction from the smallest inner diameter portion 237, and the base end side tapered portion 241 is disposed on an outward side in the cylinder inward/outward direction from the smallest inner diameter portion 237. The base portion 92A has the tubular fixing portion 201 for fixing the friction generating member 22A to the intermediate diameter hole portion 56 of the rod guide 20 (target part).

The main shaft portion 38 of the piston rod 15 is inserted through the friction generating member 22A with a predetermined interference on the inner side of the elastic rubber portion 91A. Thus, the elastic rubber portion 91A adheres to the main shaft portion 38 of the piston rod 15 throughout the entire circumference while being elastically deformed on an outward side in the radial direction.

In a state of being fitted to the piston rod 15 in this manner, in the elastic rubber portion 91A, the smallest inner diameter portion 237, a part of the distal end side tapered portion 239 on the smallest inner diameter portion 237 side, and a part of the base end side tapered portion 241 on the smallest inner diameter portion 237 side serve as a lip portion 255 which comes into sliding contact with the main shaft portion 38 of the piston rod 15.

In addition, the friction generating member 22A in a state of being fitted to the piston rod 15, the piston rod 15, the small diameter hole portion 57A of the rod guide main body 49A, and the collar 63 form a chamber 151A which communicates with the communication path 64. At that time, in the friction generating member 22A, the inner circumferential surface 238 of the distal end side tapered portion 239 thereof, the distal end lip portion 224, the inner circumferential surface 204 and the outer bottom surface 205 of the annular disk portion 200 form the chamber 151A. In the elastic rubber portion 91A, the remaining part which does not form the lip portion 255 on a side opposite to the smallest inner diameter portion 237 of the distal end side tapered portion 239 serves as a pressure receiving portion 256 which receives the pressures in the chamber 151A and the one side chamber 16 communicating therewith via the communication path 64 in the radial direction. Thus, on the inner circumferential side of the elastic rubber portion 91A, the lip portion 255 is formed on the seal member 21 side in the axial direction, and the pressure receiving portion 256 receiving the pressure in the one side chamber 16 is formed on the one side chamber 16 side in the axial direction.

In the friction generating member 22A in a state of being fitted to the piston rod 15, the inner circumferential surface 240 of the base end side tapered portion 241 of the elastic rubber portion 91A thereof, the inner circumferential surface 242 of the uniform diameter portion 243, the inner circumferential surface 244 of the tapered portion 245, the outer bottom surface 215 of the annular disk portion 202, the outer side rounded chamfer 220, and a part of the outer circumferential surface 208 on the outer side rounded chamfer 220 side form an oil storage chamber 85A. The oil lip 73 of the seal member 21 scrapes off a hydraulic fluid adhered to the piston rod 15 at the time of going out of the piston rod 15 and stores a hydraulic fluid in this oil storage chamber 85A. The oil storage chamber 85A communicates with the reservoir chamber 13 at all times via the communication hole 62, and the pressure therein is the same as that in the reservoir chamber 13.

In the friction generating member 22A in a state of being fitted to the piston rod 15, the distal end lip portion 224, the distal end surface 234 of the distal end portion 235, the outer circumferential surface 226 of the outer circumferential portion 227, the inner bottom surface 203 of the annular disk portion 200, the inner side rounded chamfer 209, the inner circumferential surface 206 of the fixing portion 201, and the inner side rounded chamfer 219 of the annular disk portion 202 form an inner chamber 261 (low pressure chamber). The inner chamber 261 communicates with the oil storage chamber 85A and the reservoir chamber 13 at all times via communication paths 253 inside the penetration holes 222, and the pressure therein is the same as that in the reservoir chamber 13.

Meanwhile, the chamber 151A communicates with the communication path 64 between the collar 63 and the piston rod 15. On the other hand, the chamber 151A communicates with the inner chamber 261 via communication paths 252 inside the penetration holes 221 of the friction generating member 22A. The flow channel cross-sectional areas of the communication paths 252 are smaller than the flow channel cross-sectional area of the communication path 64. Thus, a pressure loss due to the communication paths 252 becomes higher than a pressure loss due to the communication path 64. In addition, the flow channel cross-sectional areas of the communication paths 253 allowing the inner chamber 261 and the oil storage chamber 85A to communicate with each other are larger than the flow channel cross-sectional areas of the communication paths 252, and there is almost no pressure loss due to the communication paths 253. In the present embodiment, a constitution in which the communication paths 252 is provided, but this is not essential.

The communication paths 252 allow the one side chamber 16 and the chamber 151A to communicate with the inner chamber 261 at all times, and the communication paths 253 allow the inner chamber 261 to communicate with the oil storage chamber 85A and the reservoir chamber 13 at all times. The communication paths 252 and 253 supply a hydraulic fluid in the one side chamber 16 to the oil storage chamber 85A. Accordingly, galling due to poor lubrication of the seal member 21 is prevented. In addition, the communication paths 252 and 253 discharge air incorporated into the one side chamber 16.

In the shock absorber 11A, when the piston rod 15 moves to the extension side where the overall length of the shock absorber 11A extends and the contraction side where it contracts, the piston 18 moves to the one side chamber 16 side, and the pressure in the one side chamber 16 rises, the pressure in the chamber 151A also becomes high via the communication path 64, but rising of the pressure in the inner chamber 261 via the communication paths 252 having a high pressure loss may be in a delayed state. At this time, the upstream side of the elastic rubber portion 91A in the flowing direction of a hydraulic fluid becomes the chamber 151A and the downstream side thereof becomes the inner chamber 261. The inner chamber 261 between the downstream side of the elastic rubber portion 91A and the reservoir chamber 13 is under an internal pressure lower than the internal pressures in the one side chamber 16 and the chamber 151A.

In the elastic rubber portion 91A, the pressure receiving portion 256 of the distal end side tapered portion 239 mainly receives a force outward in the radial direction due to the differential pressures generated in this manner between the one side chamber 16, the chamber 151A, the inner chamber 261, the oil storage chamber 85A, and the reservoir chamber 13. Further, in the elastic rubber portion 91A, when the differential pressures generated in this manner between the one side chamber 16, the chamber 151A, the inner chamber 261, the oil storage chamber 85A, and the reservoir chamber 13 reach a predetermined pressure, the pressure receiving portion 256 of the distal end side tapered portion 239 is deformed outward in the radial direction due to the received a pressure. Accordingly, a gap in the radial direction is generated between the pressure receiving portion 256 and the piston rod 15, and thus the chamber 151A on the upstream side and the oil storage chamber 85A on the downstream side communicate with each other via this gap. That is, the elastic rubber portion 91A is formed such that the chamber 151A on the upstream side and the inner chamber 261 on the downstream side can communicate with each other when the differential pressure between the one side chamber 16 and the reservoir chamber 13 reaches a predetermined pressure.

Also in the shock absorber 11A of the second embodiment described above, with respect to a hydraulic damping region generating a hydraulic damping force due to a fixing orifice (not illustrated) and the disk valves 41 and 42, in an extremely low speed region of a lower piston speed, basically, a damping force due to a fixing orifice (not illustrated) and the disk valves 41 and 42 is seldom generated. For this reason, an elastic force and a frictional resistance to the piston rod 15 by the seal member 21 and the friction generating member 22A and a frictional resistance of the piston 18 to the cylinder 12 become main generation sources of a damping force.

In the shock absorber 11A of the second embodiment, in the minute amplitude regions of the piston rod 15 and the piston 18 in which a hydraulic damping force is not generated, the pressures in the one side chamber 16 and the reservoir chamber 13 are approximately equivalent to each other. For this reason, the lip portion 255 of the elastic rubber portion 91A of the friction generating member 22A comes into contact with the main shaft portion 38 of the piston rod 15 in a binding state. Thus, the friction generating member 22A generates a high slide resistance to the piston rod 15.

In contrast, in an extension stroke and a contraction stroke in an ordinary region (the foregoing hydraulic damping region) having a larger amplitude than the minute amplitude region, when the piston speed increases and the pressure in the one side chamber 16 becomes higher than the pressure in the reservoir chamber 13, the pressure in the chamber 151A communicating with the one side chamber 16 via the communication path 64 also increases in a similar manner. In contrast, the pressure in the inner chamber 261 communicating with the chamber 151A via the communication paths 252 having a high pressure loss does not increase, and the inner chamber 261 is under an internal pressure lower than the internal pressures in the one side chamber 16 and the chamber 151A. At this time, the inner chamber 261 between the downstream side of the elastic rubber portion 91A and the reservoir chamber 13 becomes a low pressure chamber under an internal pressure lower than the internal pressure in the one side chamber 16.

The elastic rubber portion 91A receives the pressures in the one side chamber 16 and the chamber 151A which are generated in this manner and are higher than those in the inner chamber 261, the oil storage chamber 85A, and the reservoir chamber 13 in the pressure receiving portion 256 on the one side chamber 16 side of the lip portion 255 which comes into sliding contact with the piston rod 15 and is deformed outward in the radial direction so that a binding force with respect to the main shaft portion 38 of the piston rod 15 is reduced and a slide resistance decreases.

When the piston speed further increases and the differential pressures between the one side chamber 16, the chamber 151A, the inner chamber 261, the oil storage chamber 85A, and the reservoir chamber 13 reach a predetermined pressure, the elastic rubber portion 91A is separated from the main shaft portion 38 of the piston rod 15 in the radial direction and allows the one side chamber 16 and the chamber 151A on the upstream side and the oil storage chamber 85A and the reservoir chamber 13 on the downstream side in the flowing direction of a hydraulic fluid to communicate with each other. At this time, in the elastic rubber portion 91A, there is no longer any slide resistance to the piston rod 15.

In this manner, in the shock absorber 11A of the second embodiment, similar to the first embodiment, the friction generating member 22A generates a sliding force corresponding to the piston speed with respect to the piston rod 15. For this reason, the shock absorber 11A of the second embodiment exhibits effects similar to those in the first embodiment.

In addition, in the shock absorber 11A of the second embodiment, the base portion 92A has a shape forming the inner chamber 261 under an internal pressure lower than the internal pressure in the one side chamber 16. For this reason, the elastic rubber portion 91A can be covered with the base portion 92A, and thus it is easy to handle the friction generating member 22A.

In addition, due to the structure in which the communication paths 253 allowing the inner chamber 261 and the oil storage chamber 85A to communicate with each other are formed in the base portion 92A, the communication paths 253 can be easily formed.

In addition, a structure in which the communication paths 252 allowing the one side chamber 16 and the inner chamber 261 to communicate with each other are formed in the base portion 92A is adopted. For this reason, the communication paths 252 can be easily formed, and characteristics can be adjusted by easily changing the sizes of the communication paths 252.

A first aspect of the embodiment described above includes a cylinder which is filled with a working fluid, an outer tube which is provided on an outer circumferential side of the cylinder, a reservoir chamber which is formed between the outer tube and the cylinder, a piston which comes into sliding contact with an inner surface side of the cylinder and divides the inside of this cylinder into a one side chamber and an opposite side chamber, a piston rod in which the piston is fixed to one end and an opposite end extends out of the cylinder, a seal member which comes into sliding contact with the piston rod and prevents the working fluid from leaking out of the cylinder, a rod guide which provided at a position on a side defined by the seal member of the cylinder and guides the piston rod, and a friction generating member which is provided at a position on a side defined by the seal member of the cylinder and comes into sliding contact with the piston rod. The friction generating member has an annular elastic rubber portion which comes into sliding contact with the piston rod and a base portion to which this elastic rubber portion is fixedly attached. The elastic rubber portion is formed such that an upstream side and a downstream side are able to communicate with each other when a differential pressure between the one side chamber of the cylinder and the reservoir chamber reaches a predetermined pressure. Accordingly, it is possible to obtain favorable working characteristics.

According to a second aspect, in the first aspect, a low pressure chamber is formed between the downstream side of the elastic rubber portion and the reservoir chamber having an internal pressure lower than an internal pressure of the one side chamber.

According to a third aspect, in the second aspect, the low pressure chamber communicates with the reservoir chamber.

According to a fourth aspect, in any one of the first to third aspects, a lip portion which comes into sliding contact with the piston rod is formed in the elastic rubber portion.

According to a fifth aspect, in the fourth aspect, the lip portion is formed on the seal member side on an inner circumferential side of the elastic rubber portion, and a pressure receiving portion receiving a pressure of this one side chamber is formed on the one side chamber side.

INDUSTRIAL APPLICABILITY

It is possible to provide a shock absorber capable of obtaining favorable working characteristics by applying the foregoing shock absorber to relevant fields.

REFERENCE SIGNS LIST 11, 11A Shock absorber
12 Cylinder
13 Reservoir chamber
14 Outer tube
15 Piston rod
16 One side chamber
17 Opposite side chamber
18 Piston
20 Rod guide
21 Seal member
22, 22A Friction generating member
85 Chamber (low pressure chamber)
91, 91A Elastic rubber portion
92, 92A Base portion
155, 255 Lip portion
156, 256 Pressure receiving portion
261 Inner chamber (low pressure chamber)

The invention claimed is:

1. A shock absorber comprising:
a cylinder which is filled with a working fluid;
an outer tube which is provided on an outer circumferential side of the cylinder;
a reservoir chamber which is formed between the outer tube and the cylinder;
a piston which comes into sliding contact with an inner surface side of the cylinder and divides the inside of the cylinder into a one side chamber and an opposite side chamber;
a piston rod in which the piston is fixed to one end and an opposite end extends out of the cylinder;
a seal member which comes into sliding contact with the piston rod and prevents the working fluid from leaking out of the cylinder;
a rod guide which is provided at a position on a side defined by the seal member of the cylinder and guides the piston rod; and
a friction generating member which is provided at a position on a side defined by the seal member of the cylinder and comes into sliding contact with the piston rod,
wherein the friction generating member has an annular elastic rubber portion which comes into sliding contact with the piston rod and a base portion to which the elastic rubber portion is fixedly attached,
wherein the elastic rubber portion is formed such that an upstream side and a downstream side of the elastic rubber portion are able to communicate with each other when a differential pressure between the one side chamber of the cylinder and the reservoir chamber reaches a predetermined pressure,
wherein a cross-sectional area of a communication path formed in the base portion is smaller than a cross-sectional area of a communication path between the piston rod and the rod guide, and
wherein the upstream side and the downstream side are communicate with each other via
the communication path between the piston rod and the rod guide, and
the communication path formed in the base portion.

2. The shock absorber according to claim 1,
wherein a low pressure chamber having an internal pressure lower than an internal pressure of the one side chamber is formed between the downstream side of the elastic rubber portion and the reservoir chamber.

3. The shock absorber according to claim 2,
wherein the low pressure chamber communicates with the reservoir chamber.

4. The shock absorber according to claim 3,
wherein a lip portion which comes into sliding contact with the piston rod is formed in the elastic rubber portion.

5. The shock absorber according to claim 4,
wherein the lip portion is formed on the seal member side on an inner circumferential side of the elastic rubber portion, and a pressure receiving portion receiving a pressure of the one side chamber is formed on the one side chamber side.

6. The shock absorber according to claim 2,
wherein a lip portion which comes into sliding contact with the piston rod is formed in the elastic rubber portion.

7. The shock absorber according to claim 6,
wherein the lip portion is formed on the seal member side on an inner circumferential side of the elastic rubber portion, and a pressure receiving portion receiving a pressure of the one side chamber is formed on the one side chamber side.

8. The shock absorber according to claim 1,
wherein a lip portion which comes into sliding contact with the piston rod is formed in the elastic rubber portion.

9. The shock absorber according to claim 8,
wherein the lip portion is formed on the seal member side on an inner circumferential side of the elastic rubber portion, and a pressure receiving portion receiving a pressure of the one side chamber is formed on the one side chamber side.

* * * * *